Jan. 23, 1934.  W. H. SILVER  1,944,674
PLOW
Filed Nov. 11, 1929    5 Sheets-Sheet 1
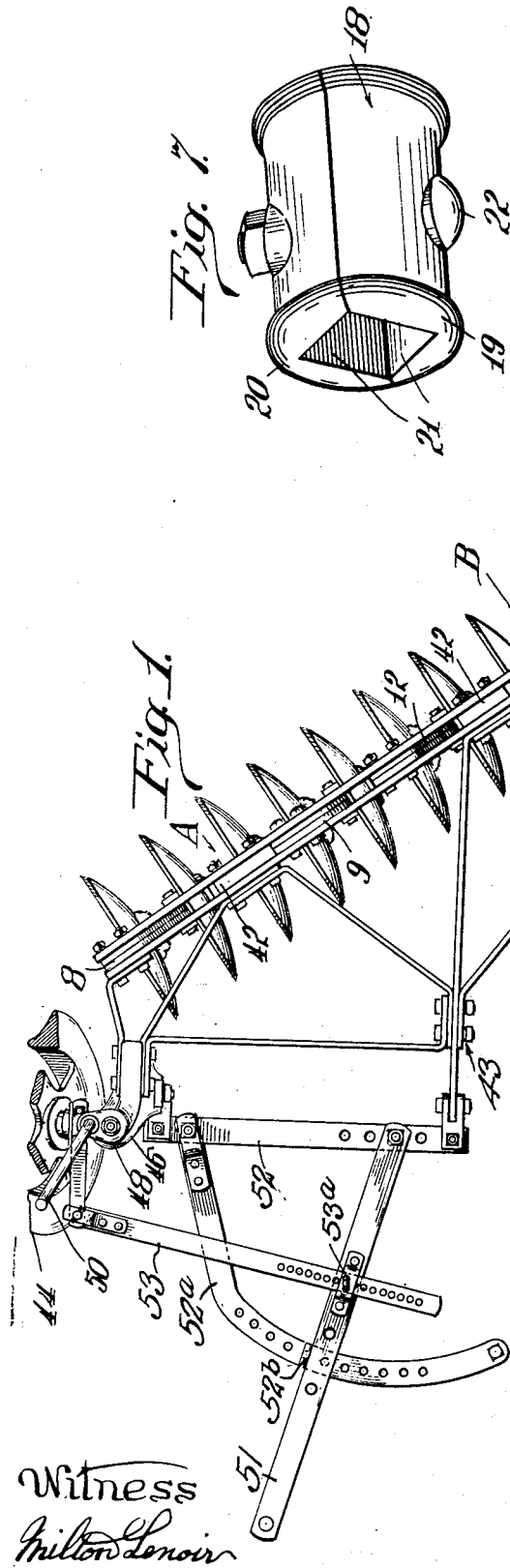
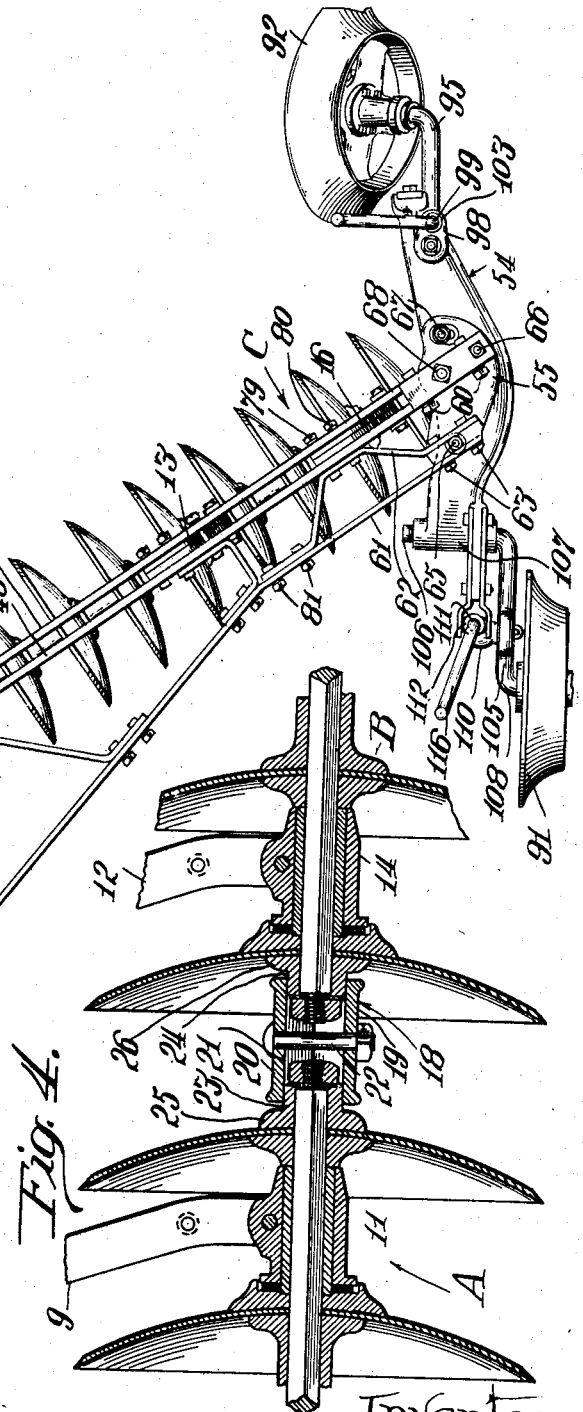
Inventor
Walter H. Silver
By Brown, Jackson, Boettcher & Dienner
Attorneys
Witness
Milton Lenoir Jan. 23, 1934.  W. H. SILVER  1,944,674
PLOW
Filed Nov. 11, 1929   5 Sheets-Sheet 2
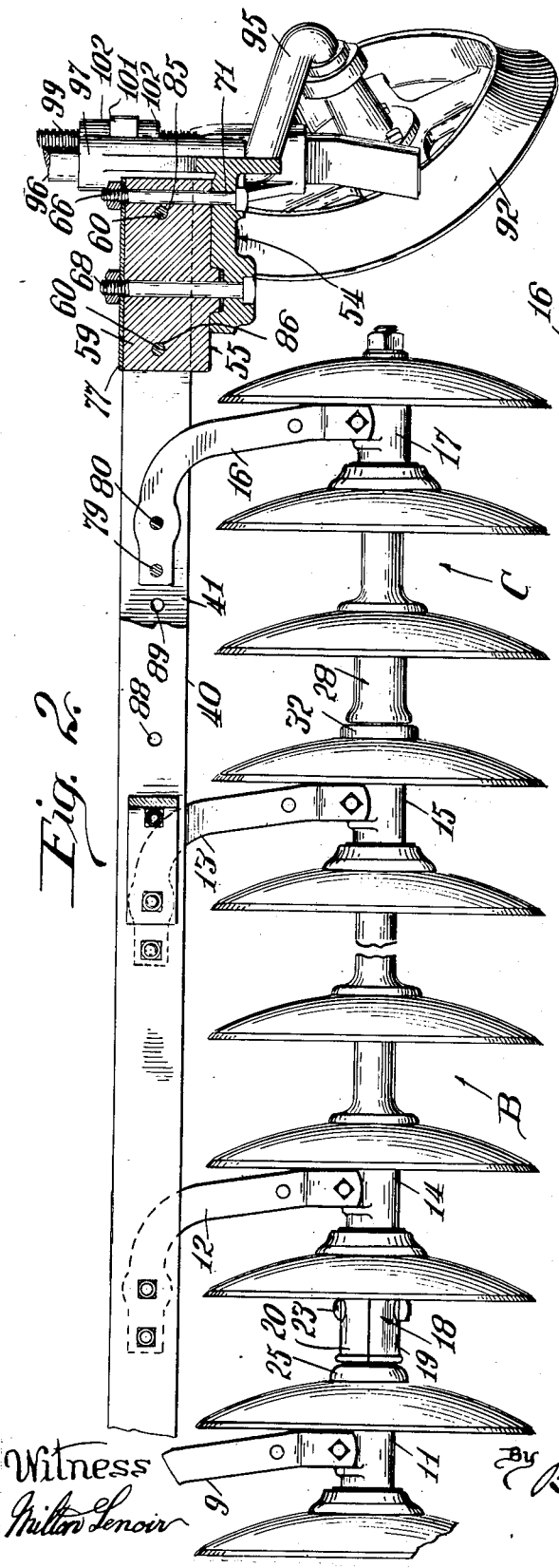
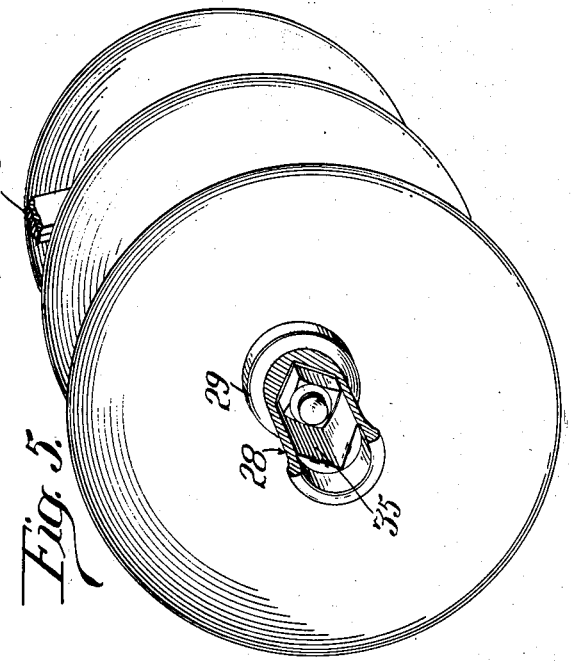
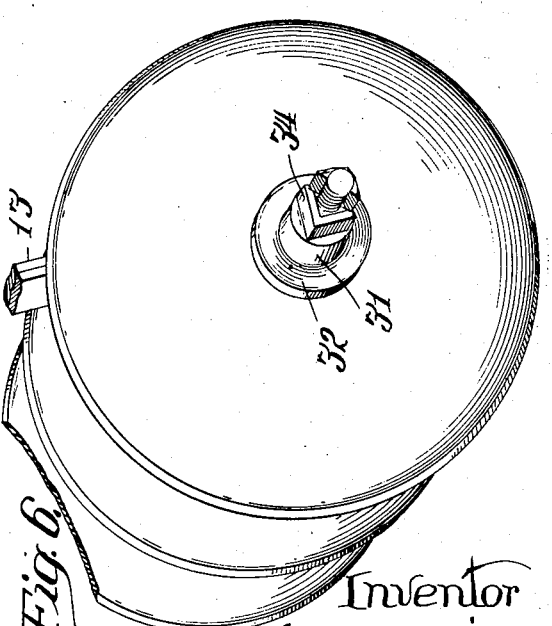
Inventor
Walter H. Silver
By Brown, Jackson, Boettcher & Dienner
Attorneys

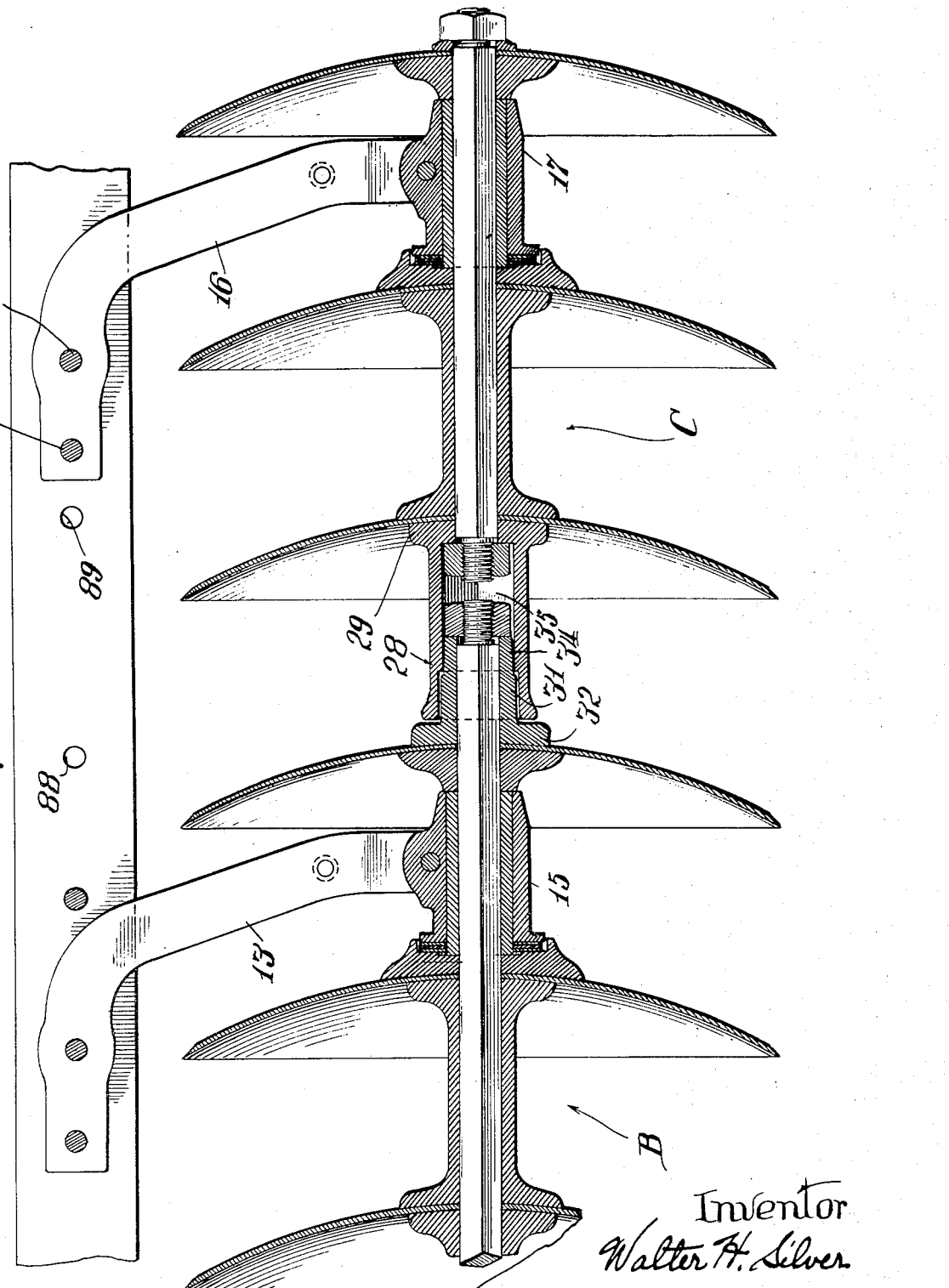

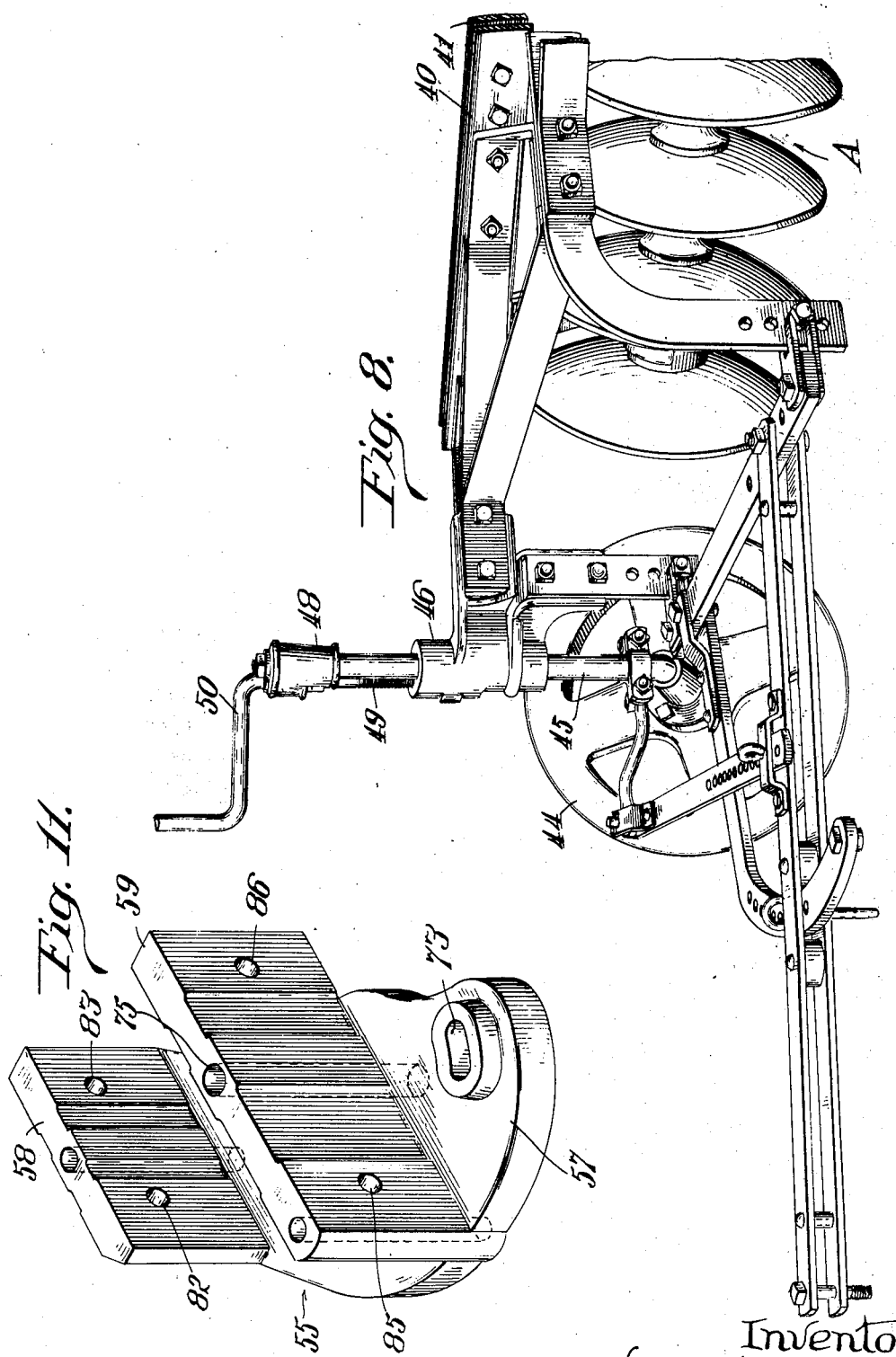

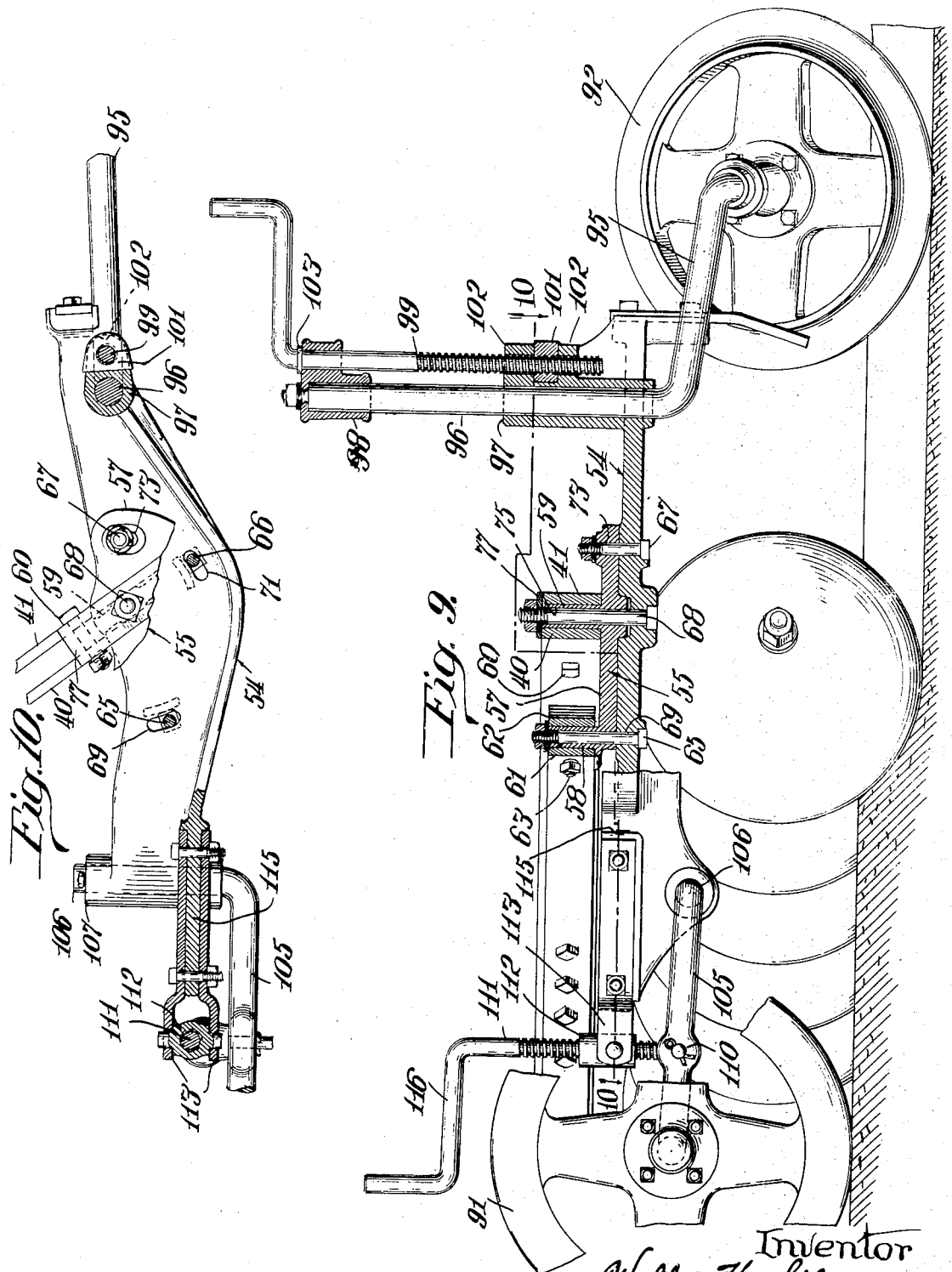

Patented Jan. 23, 1934

1,944,674

UNITED STATES PATENT OFFICE 1,944,674

PLOW

Walter H. Silver, Moline, Ill., assignor to Deere & Company, Moline, Ill., a corporation of Illinois Application November 11, 1929
Serial No. 406,179

34 Claims. (Cl. 97—53)

The present invention relates to tilling implements of the type characterized by a series of discs arranged in axial alignment, all facing in the same direction, and with the axis of the discs extending at an angle to the line of draft of the implement. Such implements are extensively used on disc plows in certain soils, particularly where a comparatively shallow plowing depth suffices in preparing the seed bed.

Some of the implements of this type have been constructed so that all of the discs are rigidly joined together across the entire width of the machine so that the discs of the entire gang are constrained to roll together at the same speed; in other machines the discs are divided into two or more sections and these sections are not connected but are adapted to roll independently of each other.

Where the discs are all conneced together considerable difficulty is encountered in turning this type of implement because the discs on the outer side of the turn tend to revolve faster than those on the inner side, thus compelling some of the discs to drag, and thus wasting an appreciable amount of the draft power available. On the other hand, where the discs are divided into sections, which sections are independent of one another, it may occur that one section might become clogged so that it would no longer roll. Turning of the implement is, however, much easier where the discs are divided into independent sections.

It is one object, therefore, of my invention to provide a disc implement wherein all the advantages of both types of implements above noted are retained while, at the same time, all the disadvantages of each are obviated.

Another object of my invention is to provide an implement of the character referred to and in which the discs are divided into sections, one section of which is capable of easy removal, in case it is desired to work a narrower strip of land. A still further object of my invention is to provide an implement of the type referred to wherein means are provided to vary the angular relationship of the aligned sections of discs with respect to the direction of travel.

Another object of my invention is to provide for such an implement wheeled supporting means which is capable of not only angular but also longitudinal adjustment with respect to the frame of the implement.

Other objects and advantages of my invention will be apparent to those skilled in the art after a consideration of the following detailed description, taken in conjunction with the accompanying drawings, in which:

Figure 1 is a plan view of the complete machine;

Figure 2 is a fragmentary front elevation certain parts being shown in section;

Figure 3 is an enlarged fragmentary vertical cross-sectional view of the rear end of the discs, showing the manner in which the rear section is coupled to the intermediate section;

Figure 4 is an enlarged fragmentary vertical cross-sectional view near the front end of the discs, showing the manner in which the front section is coupled to the intermediate section;

Figure 5 is a fragmentary perspective view of the front end of the rear disc with the coupling member shown in section;

Figure 6 is a fragmentary perspective view of the rear end of the intermediate section;

Figure 7 is a perspective view of the coupling block by which the front section and the intermediate section are coupled together;

Figure 8 is a perspective view of the front end of the machine;

Figure 9 is a side elevation of the rear end of the implement, certain parts being shown in section;

Figure 10 is a fragmentary cross-sectional view taken along the line 10—10 of Figure 9; and Figure 11 is a perspective view of the connecting member between the frame of the implement and the rear truck.

The implement comprises three sections of discs, A, B, and C. The front section A comprises five discs and is supported by standards 8 and 9 in bearings 10 and 11, the latter being shown in Figures 2 and 4. The intermediate section B, comprising eight discs, is supported by standards 12 and 13 in bearings 14 and 15. The rear section C, comprising three discs, is supported at its rear end by standard 16 in a bearing 17, and at its front end it is supported on the rear end of the intermediate section B, in a manner to be described presently.

The sections A and B are coupled together by means of a coupling block 18 which comprises two semi-cylindrical sections 19 and 20, each having a longitudinal V-shaped groove 21.

The two sections are clamped together by means of a bolt 22, and they embrace the squared ends 23 and 24 of the end clamps 25 and 26 of the two disc sections. The two disc sections are thus, at the option of the operator, locked together for simultaneous rotation when the coupling block 18 is applied, or are rotatable independently of one another when released by the removal of the coupling block.

The rear section C is not only coupled with the center or intermediate section B for simultaneous rotation therewith, but its front end is also supported on the rear end of the intermediate section B. As shown in Figures 3 and 5, the connection between the section B and the section C comprises a sleeve member 28 formed integral with the outer clamping member 29 of the front disc of the section C and an extension member 31 formed integral with the outer clamping member 32 of the intermediate section B. The extension member 31 at its end has a bearing portion 34 having a squared outer contour which fits into the boring 35 which is of corresponding square cross-section.

It will thus be noted that by this construction only one standard 16 and one bearing 17 is required, and consequently to remove this rear section C to decrease the size of the tiller, only the one standard 16 need be removed.

The frame of the implement is seen to comprise two parallel members 40 and 41 between which is clamped the standards 8, 9, 12, 13 and 16, as well as the spacing blocks 42. The bolts used to clamp the standards and the spacing blocks 42 in position are also employed to secure the component parts of the forward portion of the frame to the members 40 and 41. As best shown in Figure 1, this forward portion comprises a series of bars 43 rigidly bolted to the diagonal members 40 and 41 and form in connection therewith rigid means projecting forwardly of the forward end of the beam comprising the diagonal members 40 and 41 by which draft is transmitted thereto.

The implement is supported at its forward end by means of a front dirigible furrow wheel 44 which is mounted upon an axle member 45 slidably received within a socket member 46 secured to the front of the implement frame. At the top of the axle member 45 a head 48 is secured in which a screw 49 is rotatably mounted. The screw 49 is provided with a crank handle 50 while the threaded end of the screw 49 is received within a threaded opening in the socket member 46. In operation, the handle 50 is turned to raise or lower the wheel 44 relative to the implement frame.

The forward draft is transmitted to the rigid draft frame 43 by means of a coupling member 51 pivotally connected with a cross bar 52 carried by one of the bars of the draft frame and socket member 46. A member 52a provided with a series of holes in which a stop pin 52b may be positioned serves to limit the movement of the coupling member 51 to the right and hence to determine the point of application of the line of draft to the frame of the implement. A steering link 53 with an adjustable connection 53a serves to shift the front furrow wheel 44.

The rear end of the implement frame is supported upon a frame structure in the form of a wheeled truck, indicated generally by the reference numeral 54, as shown in Figures 1, 9 and 10. The truck 54 is connected to the implement frame through a member 55, best shown in Figure 11. The connecting member 55 comprises a bottom plate 57 having two upstanding flanges 58 and 59, preferably but not necessarily formed integral therewith. The flange 59 is clamped between the members 40 and 41 of the implement frame by means of bolts 60, and the flange 58 is clamped between the members 61 and 62 of the implement frame by means of bolts 63.

The member 55 is bolted to the truck member 54 by means of bolts 65, 66 and 67, and the pivoting bolt 68. The bolt 65 passes through the flange 58 on the member 55 and passes through a slot 69, while the bolt 66 passes through an opening 70 in the flange 59 and an arcuate slot 71 formed, like the slot 69, in the truck 54.

The bolt 67 passes through an opening in the truck 54 and is received within a slot 73 formed in the plate 57, as shown in Figure 11. All of the slots just mentioned are concentric about the pivoting bolt 68, which bolt is received in an opening 75 formed in the flange 59.

A clamping plate 77 is interposed between the top edge of the frame members 40 and 41 and the nuts of the bolt 66 and the bolt 68.

As will be obvious, the angular position of the rear truck 54 with respect to the frame of the implement may be adjusted by loosening the bolts 65, 66, 67 and 68 and turning the truck 54 to the required position, and then tightening the bolts just mentioned.

As described above the rear section C of discs is adapted for easy removal, and in case this is done it may be desirable to shift the truck 54 forward longitudinally of the frame. The construction I have provided allows such shifting. The frame member 62 is secured to the members 41 and 42 by means of bolts 79 and 80 and to the member 61 by means of the bolts 63 and bolts 81. When the disc section C is removed and it is desired to move the truck 54 forwardly, the bolts 60, 63, 79, 80 and 81 are removed, whereupon the member 62 may be turned end for end.

The truck 54 and the member 55 may be slid forwardly along the frame members 40 and 41 until the transverse holes 82 and 83 in the flange 58 register with the holes in member 61 previously occupied by the bolts 81. The member 62, being turned end for end, the bolts 63 may now be inserted as well as the bolts 79 and 80. The bolts 81 are now inserted through the holes in the member 61 previously occupied by the bolts 63. At this time the holes 85 and 86 in the flange member 59 and which receive the bolts 60 are in registry with holes 88 and 89 formed in the frame members 40 and 41. The bolts 60 may therefore be employed to clamp the flange 59 to the members 40 and 41 in its new position. Tightening the other bolts completes the operation of shifting the rear truck 54 to its new adjusted position.

Under some conditions it may be desired to operate the implement with only the disc section A, it being a very easy matter to remove the sections B and C by removing the standards 12, 13 and 16. When employed in this manner the rear truck 54 may be left in the position shown in Figure 1, or it may be shifted forwardly to the position just described above. With such a set-up, both the rear land wheel and the rear furrow wheel, designated in the drawings by 91 and 92, respectively, run on the land some distance from the furrow wall.

Under such conditions it is necessary to adjust the vertical position of the rear furrow wheel 92, and to allow for such adjustment I preferably mount the rear furrow wheel 92 on an axle member 95 having a vertical portion 96 embraced by an apertured boss 97 formed at the rear of the truck 54. At the top of the vertical portion 96 a head 98 is carried, which head 98 is provided with an opening adapted to receive the screw 99 having a crank 100. The threaded end of the screw 99 is threadedly received by a nut member 101 non-rotatably received between a pair of apertured ears 102 formed on the boss 97. By virtue of the flange 103, rotation of the screw 99 in one direction will serve to lower the wheel 92 relative to the truck 54 and the implement frame, while rotation of the screw 99 in the other direction will raise the wheel 92.

A similar means is provided for adjusting the vertical position of the wheel 91. An axle 105 is pivoted on the truck 54, the axle 105 having a laterally projected end 106 received within a bearing formed at the forward end of the truck 54. The other end of the axle 105 is bent, as at 108 in Figure 1, to receive the wheel 91 journaled thereon, and intermediate its ends the axle 105 is provided with a socket member 110 which rotatably receives the lower end of a screw 111.

The screw 111 is threaded into a nut member 112 swiveled to a pair of arms 113 bolted to a flange 115 formed on the forward end of the truck 54.

Rotation of the crank 116, which is integral with the screw 111, will raise or lower the wheel 91 relative to the truck 54.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. An implement comprising the combination of a frame, standards carried by said frame, bearings carried by said standards, a plurality of disc sections journaled in said bearings, and optionally operable means to connect said sections together for simultaneous operation or to allow the sections to rotate independently.

2. An implement comprising the combination of a frame, standards carried by said frame, bearings carried by said standards, a plurality of disc sections journaled in said bearings, and means for releasably securing said sections together.

3. An implement comprising the combination of a frame, standards carried by said frame, bearings carried by said standards, a plurality of disc sections journaled in said bearings, and means for releasably securing said sections together, said means comprising a removable coupling member adapted to optionally connect the adjacent ends of the sections.

4. An implement comprising the combination of a frame, standards carried by said frame, bearings carried by said standards, a plurality of disc sections journaled in said bearings, and means for releasably securing said sections together, said means comprising a split coupling member having means to secure the parts thereof together and adapted to optionally connect adjacent ends of the disc sections.

5. An implement comprising the combination of a frame, standards carried by said frame, bearings carried by said standards, a plurality of disc sections journaled in said bearings, each of said sections including a plurality of discs, spacing means between the discs, clamping members at the ends of the section, and a clamping bolt securing the discs, spacing means, and end clamping members together, the contiguous end clamps of adjacent sections being formed with polygonal cross section, and complementarily formed means to embrace said end clamps to cause the disc sections to rotate together.

6. An implement of the class described comprising the combination of a frame, a plurality of bearing standards, a plurality of disc sections, the rear of said sections having one end removably supported by an adjacent section, and a detachable bracket by which the other end is removably supported from the frame, said detachable bracket being removable with the removable section.

7. An implement of the class described comprising the combination of a frame, a plurality of separable tiller sections carried thereby, one section being removable, and wheel means for supporting the frame, comprising a front wheel, a rear wheeled truck, and means for adjustably securing the truck to the frame for angular adjustment relative to the frame and for longitudinal adjustment therealong.

8. An implement of the class described comprising the combination of a frame, a plurality of separable tiller sections carried thereby, each section comprising a plurality of axially aligned rotatable discs, the rear section being removable, and wheel means for supporting the frame, comprising a front wheel, a rear wheeled truck, a member adapted to be secured to the frame in any one of a plurality of adjusted positions, and means securing the truck to said member.

9. An implement of the class described comprising the combination of a frame, a plurality of separable tiller sections carried thereby, the rear section being removable, and wheel means for supporting the frame, comprising a front wheel, a rear wheeled truck, a member adapted to be secured to the frame in any one of a plurality of adjusted positions, and means securing the truck to said member, said means being operable to permit angular adjustment of the truck relative to the frame.

10. An implement of the class described comprising the combination of a frame, a plurality of separable tiller sections carried thereby, the rear section being removable, and wheel means for supporting the frame, comprising a front wheel, a rear wheeled truck, a member adapted to be secured to the frame in any one of a plurality of adjusted positions, means securing the truck to said member, said means being operable to permit angular adjustment of the truck relative to the frame, and means to adjust the position of the respective wheels on the frame and on the truck.

11. An implement of the class described comprising the combination of a frame, a plurality of separable tiller sections carried thereby, the rear section being removable, and wheel means for supporting the frame, comprising a front wheel, a rear wheeled truck, a member adapted to be secured to the frame in any one of a plurality of adjusted positions, and means securing the truck to said member, said means being operable to permit angular adjustment of the truck relative to the frame, and including a pivot bolt and a plurality of bolts passing through arcuate slots in the truck and in said member.

12. An agricultural implement comprising, in combination, a frame, a plurality of independent shaft sections, a plurality of independent bearing standards for each section, another shaft section having one end supported upon an adjacent section and the other end supported from the frame, and a plurality of discs carried by each shaft section.

13. An agricultural implement comprising, in combination, a frame, a plurality of disc sections, separate means supporting each section from the frame independently of the other sections, another disc section, said last named section having one end supported by an adjacent section, and means supporting the other end of said last named section from the frame.

14. An agricultural implement comprising, in combination, a frame, a plurality of disc sections, separate means supporting each section from the frame independently of the other sections, and removable means for causing said sections to rotate together.

15. An agricultural implement comprising, in combination, a frame, a plurality of disc sections, separate means supporting each section from the frame independently of the other sections, removable means for causing said sections to rotate together, a removable section, said last named section having one end supported by an adjacent section, and a removable bracket for supporting the other end of said last named section from the frame.

16. An agricultural implement comprising, in combination, a frame, a plurality of disc sections, separate means supporting each section from the frame independently of the other sections, a removable disc section, and separate means adapted to connect all of said sections to rotate together, certain of said separate connecting means being detachable to permit the associated sections to rotate independently.

17. An agricultural implement comprising, in combination, a frame, a plurality of bearing standards, a disc section carried by said standards, a removable disc section, there being a sleeve on said removable disc section and an extended bearing portion on said one disc section whereby one end of the removable disc section is removably supported by said one section, and means removably supporting the other end of the removable disc section.

18. An agricultural implement comprising, in combination, a frame, a plurality of bearing standards, a disc section carried by said standards, a removable disc section, there being a sleeve having a polygonal bore on said removable disc section and an extended correspondingly formed bearing portion on said one disc section whereby one end of the removable disc section is removably supported by said one section and rotatable therewith, and removable bearing means supporting the other end of said removable section.

19. An agricultural implement comprising a frame, a plurality of bearing standards, a plurality of disc sections carried by said standards, one of said sections being removable, and detachable means operative when attached to cause the other sections to rotate together.

20. An agricultural implement comprising a frame, a plurality of bearing standards, a plurality of disc sections carried by said standards, one of said sections being removable, cooperating means on said removable section and the adjacent one of the other sections whereby the removable section turns with and one end is supported by the adjacent section, and detachable means operative when attached to cause the other sections to rotate together.

21. An agricultural implement comprising a frame, said frame including two spaced side members extending at an angle to the line of draft of the implement, a plurality of disc sections each comprising a shaft and a series of discs mounted thereon, bearing standards in which the shafts of said sections are journaled, the upper ends of said bearing standards being mounted between the side members of said frame, and a wheeled truck supporting one end of the frame, said truck being clamped to said side members and angularly adjustable with respect thereto.

22. An agricultural implement comprising a frame, said frame including two spaced side members extending at an angle to the line of draft of the implement, a plurality of disc sections each comprising a shaft and a series of discs mounted thereon, bearing standards in which the shafts of said sections are journaled, the upper ends of said bearing standards being mounted between the side members of said frame, a wheeled truck for supporting one end of the frame, and a connecting member secured to the truck and including flanges clamped between the side members of the frame.

23. In a plow, the combination of a frame member, wheels supporting the same, a beam member, plow discs carried by said beam member, said member including cooperating attaching portions, one of said attaching portions having slotted bolt holes therein, and bolts passing through said bolt holes for securing said attaching portions together with said frame and beam members disposed in different angular relations for adjusting the widths of the furrows cut by said discs.

24. An implement comprising the combination of a frame, standards carried by said frame, bearings carried by said standards, a plurality of aligned disc sections journaled in said bearings, and separate complementarily formed means cooperating with the adjacent ends of two adjacent sections to cause said sections to rotate together.

25. An implement of the class described, comprising a frame having two spaced members, a connecting member disposed adjacent the rear of said frame members and comprising a base portion and an upstanding flange portion, the latter being adapted to be received between said spaced frame members, and a wheel supported truck connected with said connecting member for angular adjustment with respect thereto.

26. An implement of the class described, comprising a disc tiller having a diagonally disposed frame consisting of a pair of spaced frame members, a connecting member disposed adjacent the rear ends of said frame members and provided with an upstanding flange portion received between said frame members and serving to connect the connecting member therewith, brace means connecting said connecting member with at least one of said frame members, and a wheel supported truck pivotally connected with said connecting member and capable of angular adjustment with respect thereto.

27. An implement of the class described, comprising a disc tiller having a diagonally disposed frame consisting of a pair of spaced frame members, a connecting member disposed adjacent the rear ends of said frame members and including a base portion and an upstanding flange portion, the latter being received between the frame members and secured thereto, a wheel supported truck carrying the rear end of said frame members, and means pivotally connecting said connecting member with said truck, said pivoting means comprising a member disposed in said upstanding flange portion.

28. An implement of the class described, comprising a disc tiller having a diagonally disposed frame consisting of a pair of spaced frame members, a plurality of aligned rotatable discs connected therewith, a connecting member disposed adjacent the rear ends of said frame members and including a base portion and an upstanding flange portion, the latter being received between the frame members and secured thereto, a wheel supported truck carrying the rear end of said frame members, and means pivotally connecting said connecting member with said truck, said pivoting means comprising a bolt disposed in said upstanding flange portion and defining an axis which intersects the common axis of said discs.

29. An implement of the class described, comprising a disc tiller having a diagonally disposed frame consisting of a pair of spaced frame members arranged in substantial parallelism, standards secured to said frame members, a plurality of axially aligned discs journaled on said standards, a connecting member disposed adjacent the rear ends of said frame members and provided with an upstanding flange portion disposed between and connected with said frame members, a wheel supported truck carrying the rear end of said tiller frame, and means pivotally connecting said connecting member with said wheel supported truck comprising a bolt about which the truck is angularly adjustable with respect to the tiller frame, the axis of the bolt intersecting the disc axes and positioned in close proximity to the rearmost disc.

30. An implement of the class described comprising the combination of a frame comprising parallel members, a plurality of tiller means carried thereby, wheel means for supporting the frame comprising a rear-wheeled truck, a member adapted to be secured to the frame between said parallel members in any one of a plurality of adjusted positions, and means securing the truck to said member, said securing means being operable to permit angular adjustment of the truck relative to the frame.

31. An implement of the class described comprising a disc tiller having a frame, a wheeled truck supporting the rear end of said frame, and a pivot bolt connecting said truck with said frame and about which bolt said truck has angular adjustment relative to the frame, said wheeled truck including a crank axle pivotally mounted in a forwardly disposed bearing portion of the truck, a land wheel on said crank axle, a spindle having a vertical portion received within a vertical bearing at the rear end of said truck, and a rear furrow wheel journaled on said spindle.

32. An implement of the class described comprising a frame, a wheeled truck supporting the rear end of said frame, a pivot bolt connecting said truck with said frame and about which said bolt truck has angular adjustment relative to the frame, said wheeled truck comprising an elongated casting disposed in a generally longitudinal position with respect to the line of advance and connected with said frame intermediate its ends, said casting being provided with a forward horizontal bearing portion and a rear vertical bearing portion, a crank axle pivotally mounted in said horizontal bearing portion, a land wheel journaled on said crank axle, a spindle journaled in said vertical bearing portion, and a rear furrow wheel journaled in said vertical bearing portion, and a rear furrow wheel journaled on said spindle.

33. An implement of the class described, comprising a disc tiller having a diagonally disposed frame consisting of a pair of spaced frame members, a connecting member disposed adjacent the rear ends of said frame members and provided with a pair of parallel upstanding flange portions, one of said flange portions being received between said frame members and serving to secure the connecting member thereto, a draft member connected with and disposed parallel with respect to said spaced frame members and connected with the other of said parallel flange portions, and a wheel supported truck pivotally connected with said connecting member and capable of angular adjustment with respect thereto.

34. An implement of the class described, comprising a disc tiller having a diagonally disposed frame consisting of a pair of spaced frame members, a connecting member disposed adjacent the rear ends of said frame members and provided with a pair of upstanding parallel flange portions, one received between the spaced frame members and serving to secure the connecting member to said diagonally disposed frame, a draft member secured to the frame and including a portion disposed in parallel relation with respect to said spaced frame members, said parallel portion of the draft member being adapted to be secured to the other of said upstanding flange portions and said portion of the draft member and said spaced frame members being arranged to receive said connecting member in two positions thereon, and brace means connecting at least one of said frame members with said other flange portion and said draft member, said brace means being connected with said frame at an intermediate point, providing for a reversal of said brace means when said connecting member is shifted from one position to the other, one end of said brace means being connected with said other flange portion, while the other end is connected with said draft member.

WALTER H. SILVER.